(12) United States Patent
Koh

(10) Patent No.: US 6,692,284 B1
(45) Date of Patent: Feb. 17, 2004

(54) ELECTRICAL SOCKET AND PLUG

(75) Inventor: Chwee Guan Koh, Singapore (SG)

(73) Assignee: NNB Electronic Technology Pte. Ltd., Woodlands Link (SG)

( * ) Notice: Subject to any disclaimer, the term of this patent is extended or adjusted under 35 U.S.C. 154(b) by 0 days.

(21) Appl. No.: 09/674,575

(22) PCT Filed: Feb. 16, 2000

(86) PCT No.: PCT/SG00/00027
§ 371 (c)(1),
(2), (4) Date: Oct. 26, 2000

(87) PCT Pub. No.: WO00/51207
PCT Pub. Date: Aug. 31, 2000

(30) Foreign Application Priority Data

| Feb. 26, 1999 | (AU) | ............................................. PP8947 |
| Sep. 20, 1999 | (SG) | ............................................. 9904576 |

(51) Int. Cl.[7] ........................................... H01R 13/625
(52) U.S. Cl. ..................................... 439/346; 439/536
(58) Field of Search ................................ 439/346, 137, 439/149, 655, 692, 535, 536, 651, 653

(56) References Cited

U.S. PATENT DOCUMENTS

| 3,716,651 | A | * | 2/1973 | Werner ......................... 174/53 |
| 4,867,693 | A | * | 9/1989 | Gizienski et al. ............. 439/137 |
| 5,590,010 | A | * | 12/1996 | Ceola et al. ................... 361/93 |
| 5,921,799 | A | * | 7/1999 | Forrester .................... 439/346 |
| 6,045,374 | A | * | 4/2000 | Candeloro ................... 439/105 |
| 6,149,446 | A | * | 11/2000 | Yu ............................... 439/137 |
| 6,193,539 | B1 | * | 2/2001 | Chang ........................ 439/346 |

FOREIGN PATENT DOCUMENTS

| GB | 1475170 | * | 6/1977 | ..................... 13/14 |
| GB | 2068651 | A * | 8/1981 | ................... 13/453 |
| GB | 2165710 | A * | 4/1986 | ................... 13/707 |
| GB | 2234402 | A * | 1/1991 | ..................... 13/14 |
| GB | 2313240 | A * | 11/1997 | |

* cited by examiner

Primary Examiner—P. Austin Bradley
Assistant Examiner—Edwin A. León
(74) Attorney, Agent, or Firm—Blakely, Sokoloff, Taylor & Zafman

(57) ABSTRACT

An improved electrical socket includes a plurality of socket apertures to receive the pins of plugs. The socket apertures can receive the pins of plugs of various designs from many countries of the world. There is a plastic cover to prevent access to the internal electrical contacts when the plug is not inserted, and the plastic cover holds the plug in position when it is inserted. The electrical socket comprises a face plate connected to a socket bracket. The socket bracket has a 3-pole connector to receive wiring from the main supply, and the faceplate has corresponding 3-pole pins for mating connection with the 3-pole connector when the face plate is attached to the socket bracket for easily change of the face plate. A circuit breaker on the electrical socket prevents damage to an appliance attached to the socket due to current leakage or shock current, and the user is warned when there is a heat overload. An improved electrical plug is also described.

65 Claims, 10 Drawing Sheets

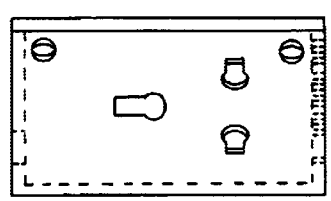
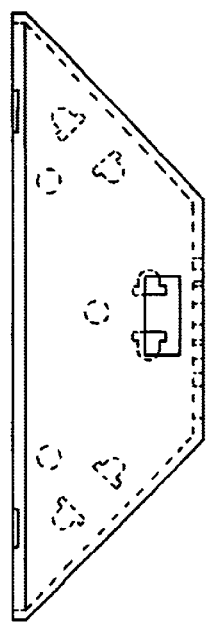
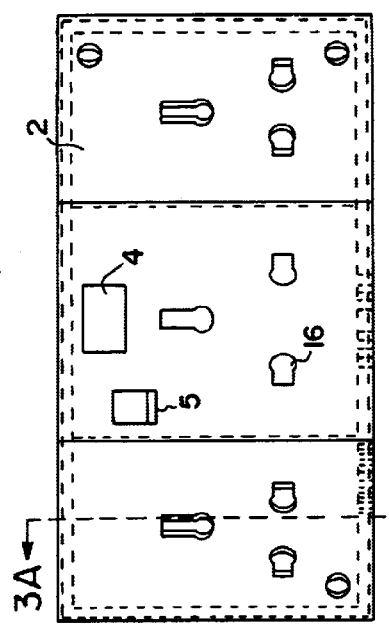
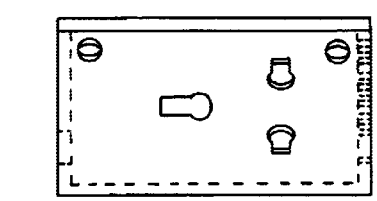
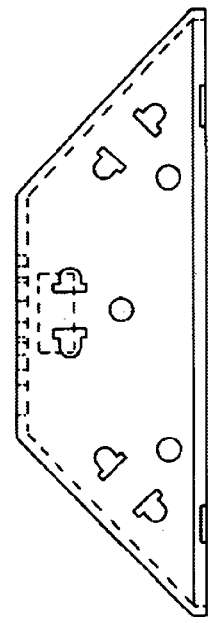
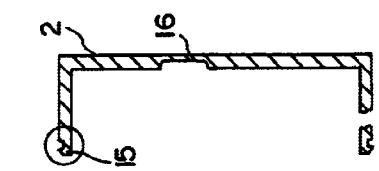

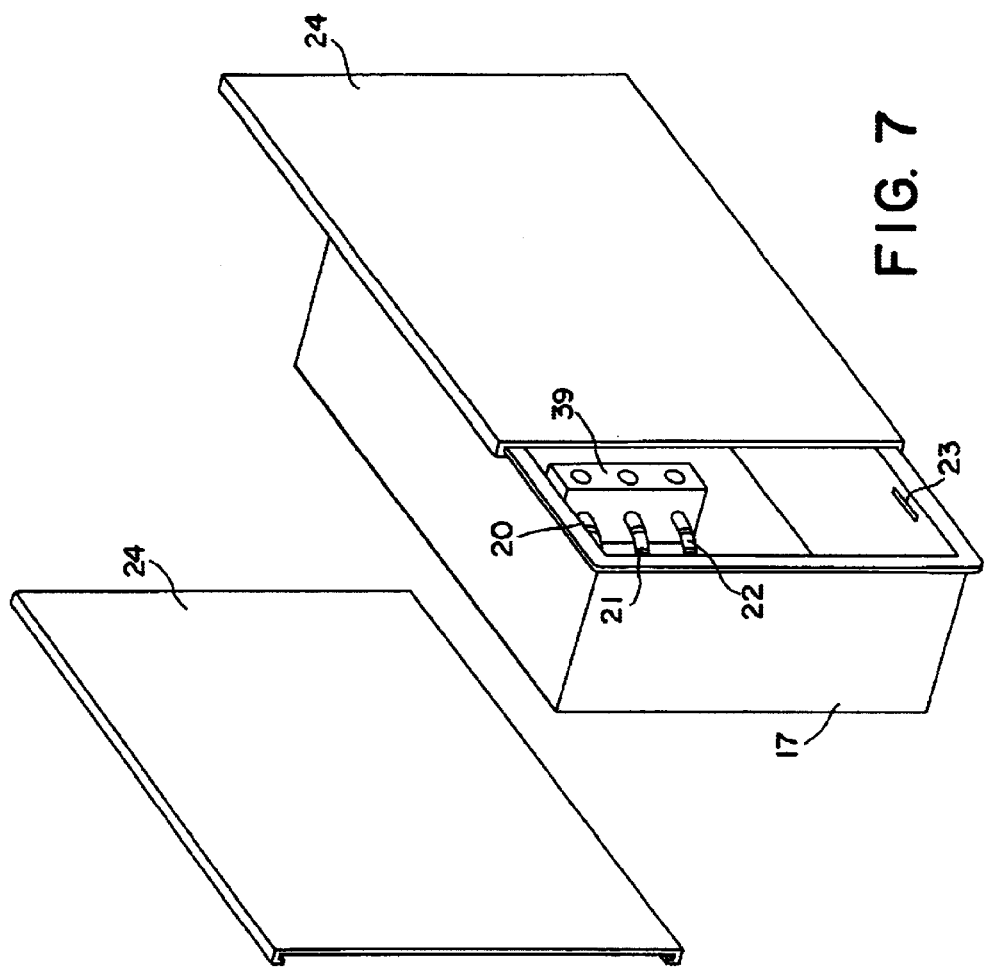

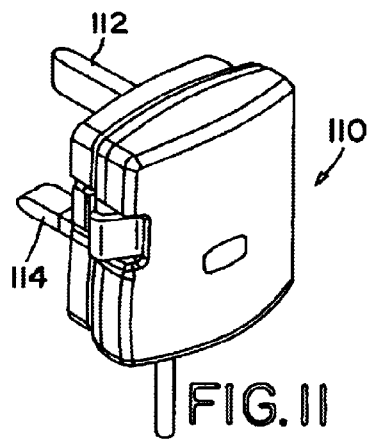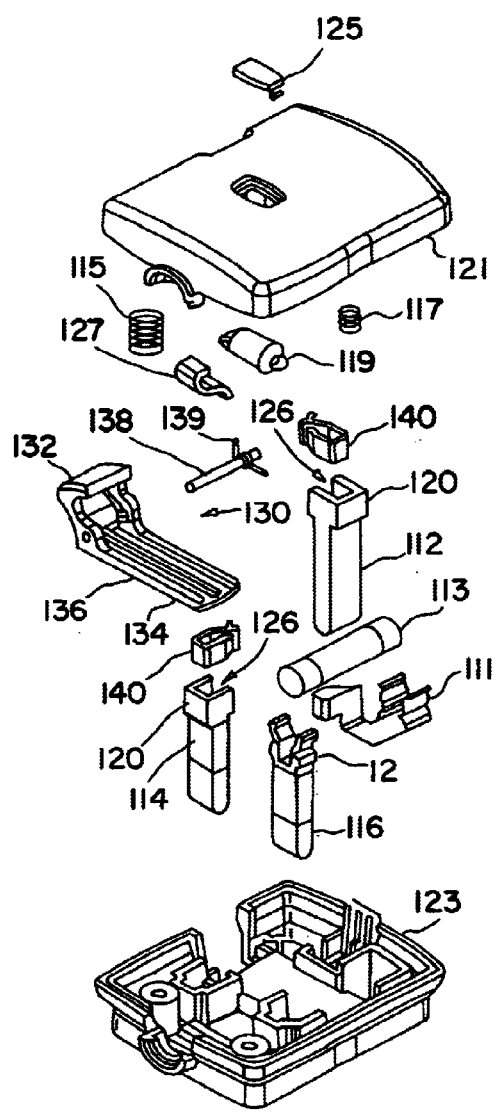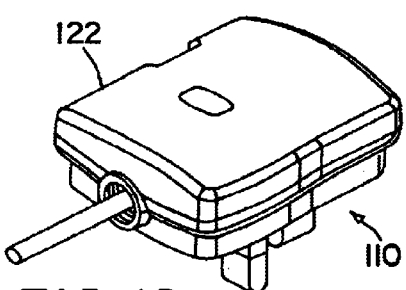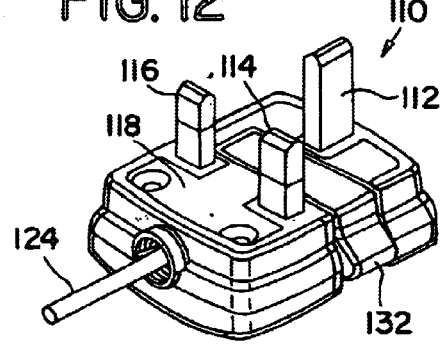
FIG. 11
FIG. 12
FIG. 13
FIG. 14

ELECTRICAL SOCKET AND PLUG

FIELD OF THE INVENTION

The present invention relates to an improved electrical socket.

BACKGROUND TO THE INVENTION

The design and construction of conventional electrical sockets are well-known. They consist of a socket with socket apertures for connecting 2-pin or 3-pin plugs and an On/Off switch. The disadvantages of these sockets is that plugs connected to the socket can be unintentionally dislodged when a pulling force acts on the plug in a direction away from the socket Further, once an electrical socket is damaged and/or burnt out, the whole socket needs to be replaced. The person replacing the socket requires knowledge of electrical wiring, in order to make the appropriate connections of the live, neutral and earth wires. The wires must be meticulously screwed into the electrical contacts of the new socket.

Also, the appliance attached to the conventional socket may be damaged as a result of current leakage or current overload. Even where the damage is prevented by a central fuse box, it may be difficult to tell which of the appliances in the house or factory premises caused the tripping of the fuse box Sometimes, a small fuse may conventionally, be inserted into a plug. When there is a current overload, the fuse will cut off the electrical connection. The problem is that the user must open up the plug and replace the fuse. This is inconvenient, Finally, if too many appliances are connected to a conventional socket too much heat may be generated which will damage the socket. The invention seeks to overcome the above disadvantages of conventional electrical sockets.

SUMMARY OF THE INVENTION

The present invention was developed with a view to providing an improved electrical socket which can prevent a plug from being unintentionally dislodged when in connection with the socket. It is a further objective of this invention to make it easy to replace the socket with a new socket or different configuration of socket without having to rewire the socket. It is a still further objective of this invention to incorporate an internal circuit-breaker mechanism for such electrical socket so that each appliance attached to the electrical socket is protected in the event of current leakage or electrical overload.

According to one embodiment of the present invention, there is provided an electrical socket for a plug having a plurality of pins, comprising (1) a socket face plate including at least one set of apertures therein for receiving the respective pins of an electrical plug, wherein the socket face plate carries (i) at least live and neutral connectors, whereby the corresponding live and neutral pins on the plug are able to be brought into electrical connection with respective live and neutral connectors of the face plate when the plug pins are received in the set of apertures, and (ii) means for preventing withdrawal of the pins from the socket face plate when the pins have been received in the apertures, and (2) a socket support including (i) at least live and neutral connectors which are adapted to be electrically connected to a mains electrical supply, and (ii) securing means which releasably secures the socket face plate to the socket support, wherein when the socket face plate is secured to the support by securing means, the live and neutral electrical connectors on the socket face plate are brought into electrical connection respectively with the live and neutral connectors on the socket support.

In one embodiment, the means for preventing withdrawal comprises a screen having a plurality of apertures therein for receiving the pins of the plug, and wherein the screen is movable relative to said socket face plate between a first position in which at least one of the screen apertures are out of alignment with the socket plate apertures, and a second position in which the screen apertures are in alignment with the socket plate apertures, said first condition corresponding with a condition wherein a said plug is able to be prevented from withdrawal from said socket face plate by virtue of engagement of a surface of said screen with a complementary locking formation of at least one pin of said plug.

In one embodiment, the screen is engaged to said socket face plate in a manner movable from the first position to the second position under the pressure of the plug pins when the plug is moved to a fully inserted position with said socket.

In one embodiment, the screen is provided with an operating member for manually moving the screen from the first position to the second position to allow any said plug restrained from removal by said screen to become free for removal from said socket.

In one embodiment, the screen is biased towards the first position so that said surface of said screen is biased toward engagement with complementary locking formations of said pin when the plug is received by the socket.

In one embodiment, the socket face plate is provided with at least two of said sets of apertures.

In one embodiment, the size and/or configuration of one of said sets of apertures is different from the size and/or configuration of another of the sets of apertures, whereby the socket face plate is adapted to receive at least two different types of plug.

In one embodiment, the socket support is further provided with an earth connector which is adapted to be connected to a mains electrical supply.

In one embodiment, the socket face plate is further provided with an earth connector which is brought into electrical connection with the earth connector of the socket support when the face plate is secured to the socket support, whereby an earth pin of the plug can be bought into electrical connection with the earth connection of the socket face plate when the plug pins are received in the set of apertures in the socket face plate.

In one embodiment, the electrical connectors on the socket face plate each comprises a projection and the electrical connectors on the socket support each comprise a recess, each projection being received in a respective recess when the socket face plate is secured to the socket support.

In one embodiment, the electrical connectors on the socket support each comprises a projection, and the electrical connectors on the socket face plate each comprise a recess, each projection being received in a respective recess when the face plate is secured to the support.

In one embodiment, the securing means comprises a snap-fit connection provided between the socket support and the socket face plate.

In one embodiment, a cover is provided for the socket support, the cover being releasably securable to the socket support when the socket face plate has been released from the support, the cover serving to prevent access to the electrical connections of the support.

In one embodiment, the socket support further comprises a housing within which the electrical connectors are disposed and presents the securing means for securing the socket face plate to the housing.

In one embodiment, a circuit breaker is carried on the socket face plate for disconnecting the electrical connection between the mains supply and any plug received in the or each set of apertures in response to a current leak or current overload in such away that said circuit breaker is received within the support housing when the socket face plate is secured to the support.

In one embodiment, the socket support is adapted to be fixed to a structure and the electrical connections of the socket support are adapted to be directly connected to the mains wires installed in the structure.

In one embodiment, the electrical socket further comprises an electrical connector lead, and a plug, the electrical connector lead being secured at one end to the electrical connections of the socket support, and being secured at the other end to the plug.

In one embodiment, the electrical connectors of the socket support are provided in the form of a female connector and the electrical connectors carried by the socket face plate are provided in the form of a male connector.

In one embodiment, the electrical connectors of the socket support are provided in the form of a male connector and the electrical connectors carried by the face plate are provided in the form of a female connector.

According to another embodiment of the present invention, there is provided an electrical socket for a plug having a plurality of pins comprising (1) a socket face plate including at least one set of apertures therein for receiving the respective pins of an electrical plug, wherein the socket face plate carries (i) at least live and neutral connectors, whereby the corresponding live and neutral pins on the plug are able to be brought into electrical connection with respective live and neutral connectors of the face plate when the plug pins are received in the set of apertures; and (2) a socket support including (i) at least live and neutral connectors which are adapted to be electrically connected to a mains electrical supply, and (ii) securing means which releasably secures the socket face plate to the socket support, wherein when the socket face plate is secured to the support by securing means, the live and neutral electrical connectors on the socket face plate are brought into electrical connection respectively with the live and neutral connectors on the socket support.

In one embodiment, the socket face plate is provided with at least two of said sets of apertures.

In one embodiment, the size and/or configuration of one of said sets of apertures is different from the size and/or configuration of another of the sets of apertures, whereby the socket face plate is adapted to receive at least two different types of plug.

In one embodiment, the socket support is further provided with an earth connector which is adapted to be connected to a mains electrical supply.

In one embodiment, the socket face plate is further provided with an earth connector which is brought into electrical connection with the earth connector of the socket support when the face plate is secured to the socket support, whereby an earth pin of the plug can be bought into electrical connection with the earth connection of the socket face plate when the plug pins are received in the set of apertures in the socket face plate.

In one embodiment, the electrical connectors on the socket face plate each comprises a projection and the electrical connectors on the socket support each comprise a recess, each projection being received in a respective recess when the socket face plate is secured to the socket support.

In one embodiment, the electrical connectors on the socket support each comprises a projection, and the electrical connectors on the socket face plate each comprise a recess, each projection being received in a respective recess when the face plate is secured to the support.

In one embodiment, the securing means comprises a snap-fit connection provided between the socket support and the socket face plate.

In one embodiment, a cover is provided for the socket support, the cover being releasably securable to the socket support when the socket face plate has been released from the support, the cover serving to prevent access to the electrical connections of the support.

In one embodiment, the socket support further comprises a housing within which the electrical connectors are disposed and presents the securing means for securing the socket face plate to the housing.

In one embodiment, a circuit breaker is carried on the socket face plate for disconnecting the electrical connection between the mains supply and any plug received in the or each set of apertures in response to a current leak or current overload in such away that said circuit breaker is received within the support housing when the socket face plate is secured to the support.

In one embodiment, the socket support is adapted to be fixed to a structure and the electrical connections of the socket support are adapted to be directly connected to the mains wires installed in the structure.

In one embodiment, the electrical socket further comprises an electrical connector lead, and a plug, the electrical connector lead being secured at one end to the electrical connections of the socket support, and being secured at the other end to the plug.

In one embodiment, the electrical connectors of the socket support are provided in the form of a female connector and the electrical connectors carried by the socket face plate are provided in the form of a male connector.

In one embodiment, the electrical connectors of the socket support are provided in the form of a male connector and the electrical connectors carried by the face plate are provided in the form of a female connector.

BRIEF DESCRIPTION OF THE DRAWINGS

In order to facilitate a more comprehensive understanding of the nature of the invention, a preferred embodiment of the electrical socket and plug device in accordance with the invention will now be described in detail, by way of example only, with reference to the accompanying drawings, in which:

FIG. 3 is the front view of the face plate of the electrical socket of FIG. 1.

FIG. 3A is a side view of the electrical socket of FIG. 3 taken along the line A—A.

FIG. 7 illustrates the safety cover which can be used to cover the socket bracket when the face plate is not attached thereto.

FIG. 11 is a top perspective view of a preferred embodiment of an electrical plug in accordance with the invention;

FIG. 12 is a side perspective view of the electrical plug of FIG. 11;

FIG. 13 is a bottom perspective view of the electrical plug of FIG. 11;

FIG. 14 is an exploded view of the electrical plug of FIG. 12;

DETAILED DESCRIPTION OF THE PREFERRED EMBODIMENTS

Figure 1:
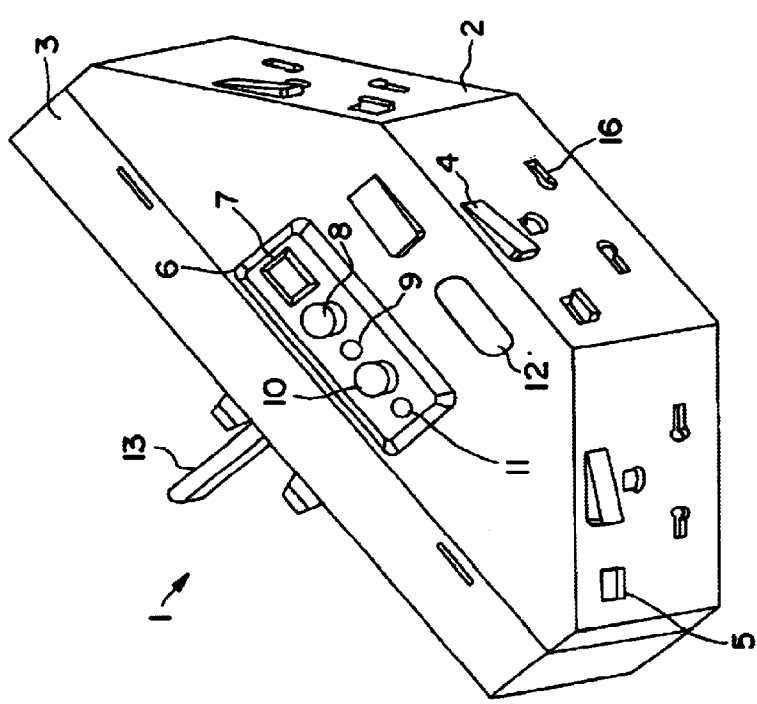
FIG. 1 is a perspective view of an electrical socket according to the preferred embodiment of this invention.

FIG. 1 illustrates the preferred embodiment of an improved electrical socket (1) in accordance with the invention. In this embodiment, a socket bracket (3) is attached to the face plate (2) by means of screws or snap-on means. On the face plate (2) are a plurality of socket apertures (16) for receiving plug-pins (35). Corresponding to each set of socket apertures (16) is an on/off switch (4) for turning the current on or off. Also associated with and located behind each socket aperture (16) on the inside of the face plate (2) is a plastic cover (37) which has a plastic cover lever (5).

The electrical socket (1) also has a circuit breaker (6), which from an external view, consists of a shock bulb (7), reset button (8), current cut-off bulb (9), start button (10) and overload light bulb (11). The details of the operations of these features will be elaborated on below. Optionally, the face-plate may also include a night light (12) which can be switched on at night.

Figure 2:
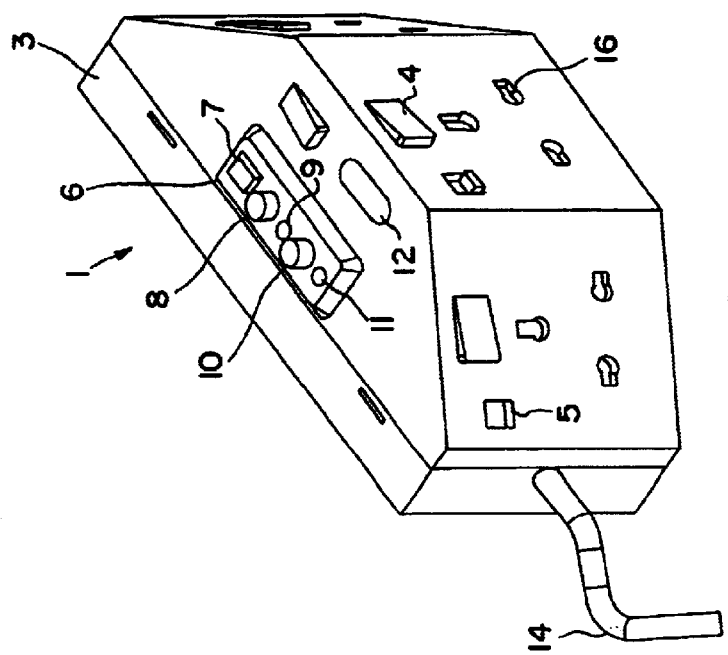
FIG. 2 is a perspective view of an electrical socket according to another preferred embodiment of this invention, wherein the electrical socket is attached to an extension cable.

In the embodiment of the invention shown in FIG. 1, at the rear of the socket bracket are plug pins (13) for connection to a main power source (not shown). In the second preferred embodiment of the invention shown in FIG. 2, the electrical socket (1) has an extension cable (14) so that the electrical socket (1) may act as an electrical extension. FIGS. 1 and 2 Illustrate designs which enable the electrical socket (1) to have multiple sets, of socket apertures in different configurations, and the apertures ,an receive different types of plugs from countries such as the United States, United Kingdom, Japan, Australia, Taiwan and India without limitation. FIG. 3 is the front view of the face plate (2), showing the socket apertures (16), plastic cover lever (5) and on/off switch (4). FIG. 3A is a cross-sectional view of the face plate taken at line A—A of FIG. 3. In this preferred embodiment of the invention, the face plate (2) includes a snap-on notch (15) at the rear of the face plate (2). The said snap-on notch (15) is meant for engagement with a corresponding bracket notch (23) formed on the socket bracket (3). It would be apparent to a person skilled in the art that other engagement means, such as screws, may also be used alone andlor with the snap-on means to connect the face plate (2) to the socket bracket (3).

Figure 4:
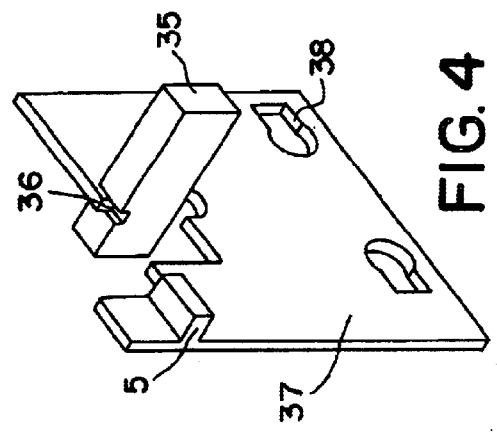
FIG. 4 is a perspective view of the pin of a plug and plastic cover only, without the face plate of the electrical socket.

FIG. 4 illustrates the interaction of the plastic safety cover (37) and the pin of a plug (35). When no plug is inserted into the socket aperture (16), the plastic cover (5) prevents access to the internal parts, of the socket. The plastic safety cover (37) is biased downwards by means of a torsion spring or other similar device. In this biased position, the plastic cover apertures (38) are out of alignment with the socket apertures (16). The plastic safety cover (37) will thus prevent access to the internal electrical components. Before inserting the plug (not shown) into the socket aperture (16), the plastic safety cover (37) and plastic cover lever (5) are forced upwards using the plastic cover lever (5) to align the plastic cover aperture (38) with the socket aperture (16) to allow the plug to be inserted. Alternatively, the use of a plug-pin (35) with a tapered end-will automatically lift the plastic safety cover (37) during insertion. Once the plug is fully inserted, the plastic safety cover (37) catches the notch (36) on the plug-pin (35), thereby securing the plug-pin (35) to the socket aperture (16). As a result, a pulling force on the plug will not remove it from its inserted position. In order to remove the plug, the plastic cover lever (5) must be pushed upwards in order to release the plastic safety cover (37) from locking connection with the notch (36) and allow the plug to be pulled out.

Figure 5:
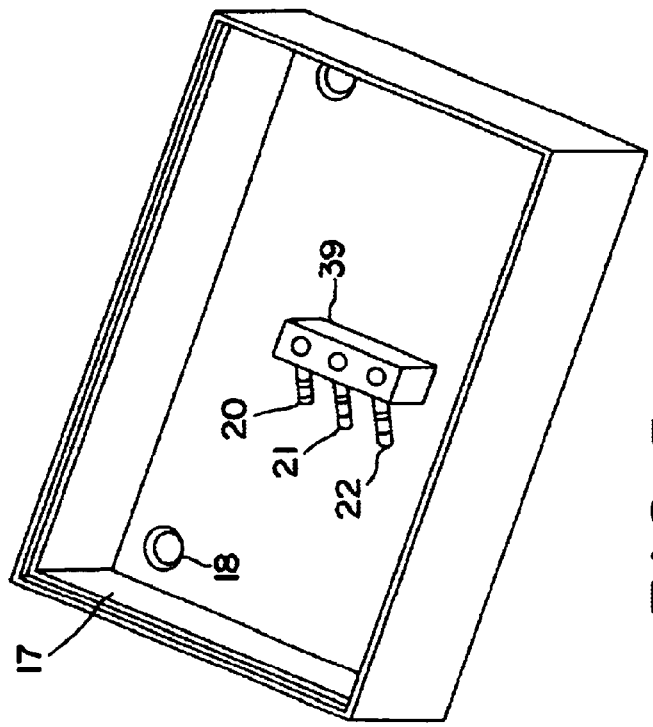
FIG. 5 is the perspective view of the socket bracket when separated from the face plate.

FIG. 5 illustrates a third preferred embodiment of the invention, with an "in-box" socket bracket (17). The "in-box" socket bracket (17) may be secured into a wall or other permanent fixture. The "in-box" socket bracket (17) include's holes for screws (18) or it may include other means to secure the "in-box" socket bracket (17) to the wall or other permanent fixture.

The socket bracket (3 or 17) includes a 3-poles connector (39) for mating combination with corresponding 3-pole pins (25) on the face plate (2). The 3 poles correspond to the live wire (20), earth wire (21) and neutral wire (22) of an electrical connection. The said wires (20, 21 and 22) are secured to the 3-poles connector (39) by the use of screws, electrical clips or other means during installation of the socket bracket (17) to the wall. Once the socket bracket (17) has been, properly installed, there is no need to remove it again even when the face plate (2) needs to be replaced.

Figure 6:
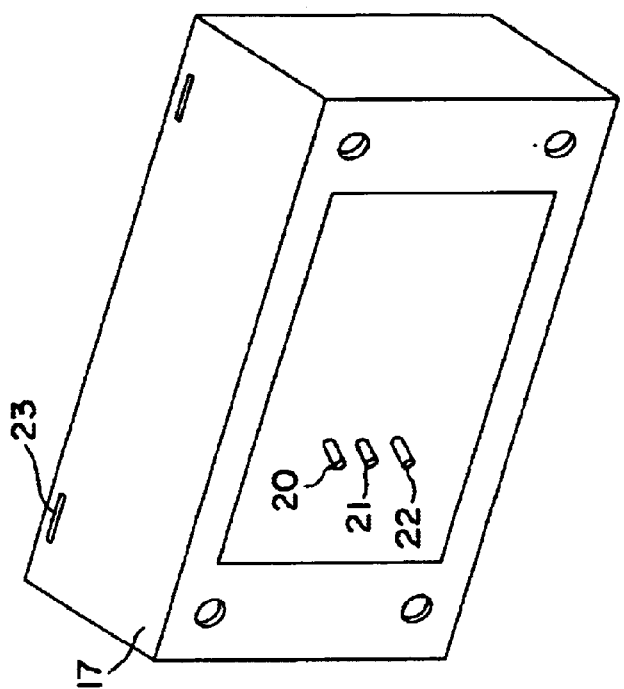
FIG. 6 is the rear view of the socket bracket of FIG. 5.

FIG. 6 shows the rear of the same socket bracket (17) wherein the wire (20, 21 and 22) extend outwards through holes pre-formed on the socket bracket The bracket notch (23) for snap-on connection with the face plate (2) is also shown. Further, FIG. 7 illustrates the safety cover (24), which can be used to cover the socket bracket (17) when the electrical socket (1) is not in use and the face plate (2) is removed therefrom. The safety cover conceals the internal wiring of the socket bracket (17), and may also be designed as a decorative item with different colours.

Figure 9:
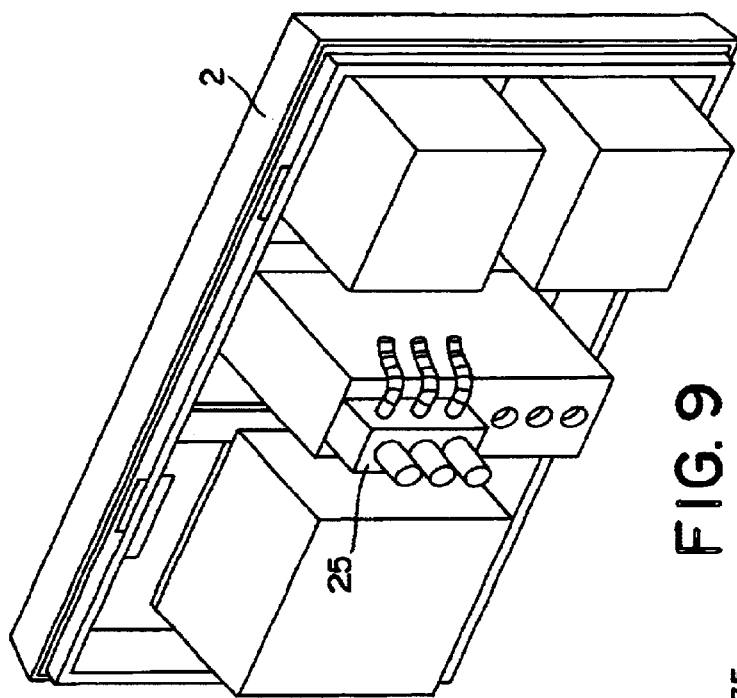
FIG. 9 is a rear view of the face place of FIG. 8 illustrating the 3-point pins.
Figure 8:
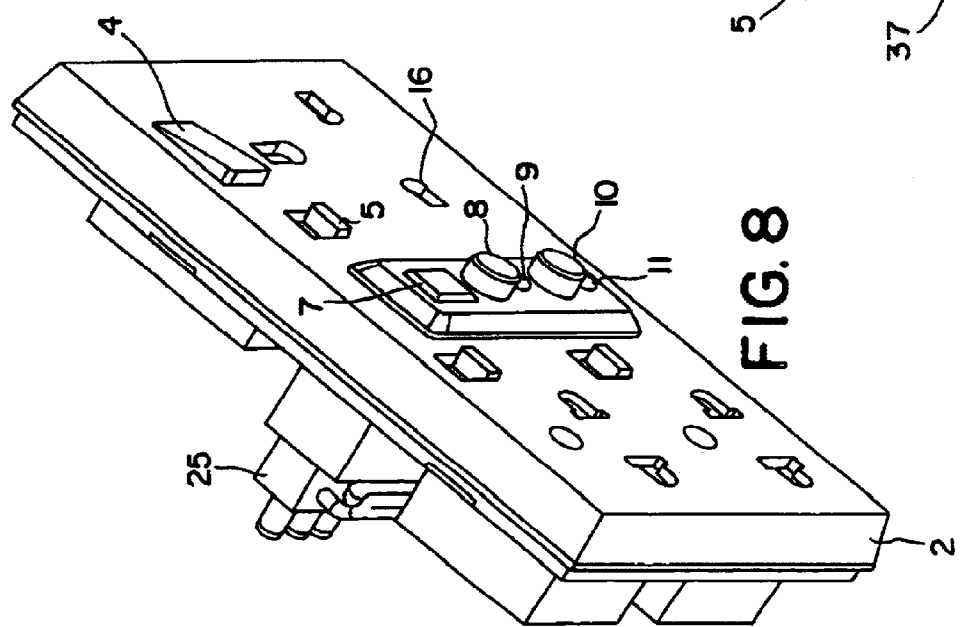
FIG. 8 illustrates the face plate of the electrical socket without the socket bracket, wherein the circuit-breaker assembly and 3-point pin-assembly are revealed.

FIGS. 8 and 9 illustrate the 3-pole pins (25) to the rear of the face plate (2) for convenient mating combination with the 3-pole connector (39) of the socket bracket 3 or (17). The 3-pole pins (25) are made of electrically conductive material. It is simple to connect the socket apertures (16) of the face plate (2) to the electrical wiring connection, because the connection is formed when the 3-pole pins (25) are inserted into the 3-pole connector (39), when the face plate (2) is joined to the socket bracket (3 or 17).

It is apparent from the above description that the invention improves versatility because socket brackets of different configurations (eg 3 or 17) may be matched or substituted with face plates (2) of different configurations without a need for the user to re-wire the socket.

Figure 10:
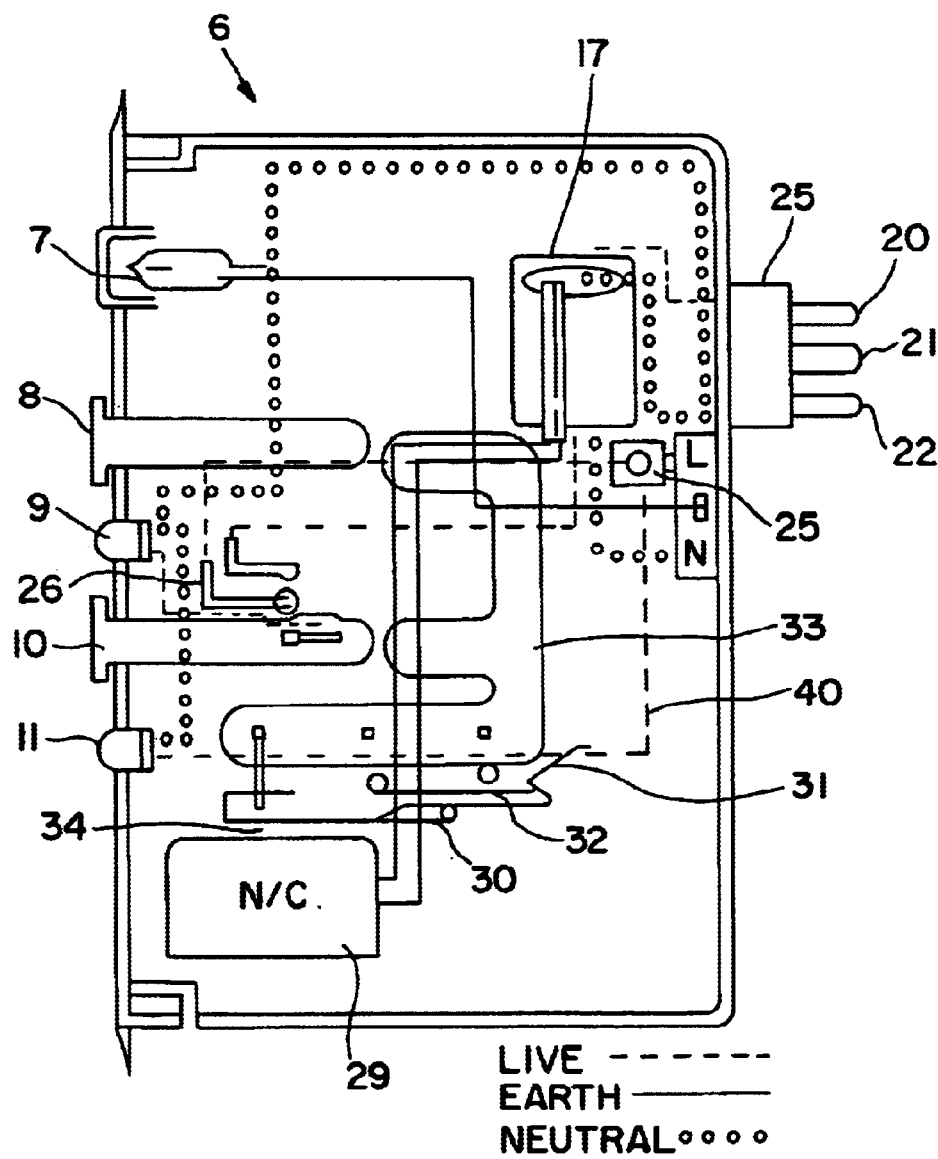
FIG. 10 is a cross-sectional view of the circuit-breaker assembly showing the internal construction of the same.
Figure 15A:
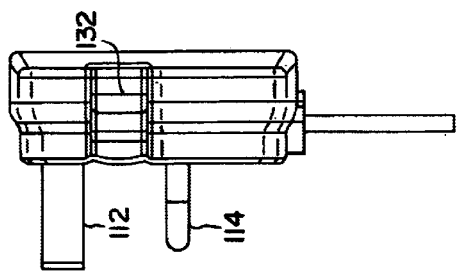
FIGS. 15(a),(b),(c),(d) and (e) illustrate the electrical plug of FIG. 11 showing a release mechanism in a first position.
Figure 15B:
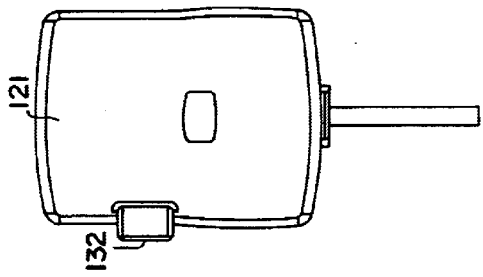
Figure 15C:
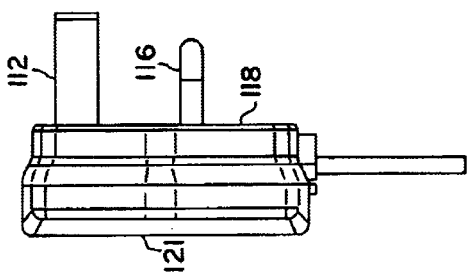
Figure 15D:
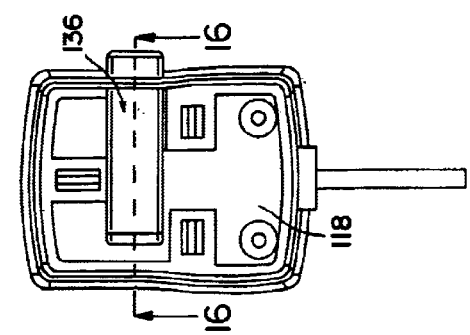
Figure 15E:
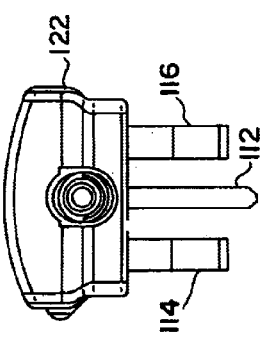

FIG. 10 is a cross-sectional view of the circuit breaker (6) assembly illustrating the mechanism of the circuit breaker. The circuit breaker (6) includes a shock bulb (7), reset button (8), current cut-off bulb (9), start switch (26), start button (10) and overload light bulb (11), each with its separate function.

The set-up of the wiring according to the preferred embodiment of this invention is shown in FIG. 10. Briefly, the live wire (20) and neutral wire (22) are wound around the current transducer coil (27) two or three times and are connected to the N/C contact switch (29). The earth wire (21) is connected to the shock bulb (7). Another lead of the neutral wire (22) is connected to the shock bulb (7), current cut-off bulb (9) and overload light bulb (11) in sequence. The function of the shock bulb (7), which lights up upon a current leakage or overload, is to absorb any leakage or shock current so as not to damage the appliance. As shown in FIG. 10, the shock bulb (7) is earthed.

Any leakage or shock current down to as low as 50 watts is sufficient to trigger the N/C contact switch (29). Upon being triggered by a leakage or shock current, the NIC contact switch (29) will activate the lever A (30) and push lever B (31) until the spring lever C (32) is released from lever A (30). Then lever D (33) will be triggered and the reset button (b) will be pushed forward. The extension pin (34) will then push lever A (30) back to its normal position and depress the N/C contact switch (29) to its normal position.

Simultaneously, the start button (10) will also be pushed out and the current cut-off bulb (9) will light up, preferably in red in the preferred embodiment. At this time, the power supply from the electrical source is totally cut off. The overload light bulb (11), will also light up (preferably in orange in the preferred embodiment), which indicates that the socket (1) is overloaded.

To restart the appliance, the user should first push the reset button (8) to its depressed position, and then depress the start button (10). As a result, the start switch (26) will close the circuit connection.

To protect the electrical socket (1) from damage due to current overload when too many electrical appliances are connected to it, a thermostat (28) is used. The thermostat (28) will only be activated at a certain temperature (say 105° C.), at which the electrical socket (1) is safe from damage. At a temperature greater than the predetermined temperature, the thermostat (28) will close the electrical connection of the live wire (40) connecting the overload light bulb (11) to the thermostat, to thermostat (28). As a result, the overload light bulb (11) will light up warning the user before damage, such as the melting of the electrical socket (1) occurs. Alternatively, in another embodiment, the thermostat (28) can instead be used to cut off the electrical connection from the mains supply to the plug inserted into the electrical socket (1).

FIGS. 11 to 14 illustrate a preferred embodiment of an improved electrical plug (110) in accordance with the invention. In this embodiment, the electrical plug is of the type having three pins, namely an earth pin (112), a neutral pin (114) and live pin (116). The three pins protrude from a front face (118) of the plug and are provided with terminals (120) (see also FIG. 20) inside a housing (122) of the plug, to which the corresponding wires of a three core flex cable (124) are connected.

As can be seen most clearly in FIG. 14, the housing (122) of the plug consists of a top shell (121) and a bottom shell (123). The top shell (121) has a small lens (125) provided therein, made of coloured translucent plastic Within the housing (122) there is provided a bulb (119), which is held between a first bulb contact (115) and a second bulb contact (117), and which is illuminated when the plug is corrected to a live power outlet. A fuse (113) is connected in series with the live pin (116) in a fuse holder (111). A cable holder (127) holds the cable (124) stable.

The electrical plug (110) further comprises a release mechanism (130) provided in the plug for releasing the plug from a socket. The release mechanism (130) includes a first portion (132) that protrudes from a side of the plug (110) and which is designed to be pressed by a user to activate the release mechanism (130). The release mechanism (130) also includes a second portion (134) that is pushed against the socket by means of a lever action when the first portion (132) is pressed by the user (see FIG. 17). In this way, the three pins (112), (114) and (116) of the plug are withdrawn from the socket by the action of the release mechanism (130) when activated.

In this embodiment, the release mechanism (130) includes a lever member (136) which is pivotally mounted in the housing (122) of the plug. The first and second portions (132), (134) of the release mechanism are formed integral with the lever member (136). Lever member (136) is manufactured of rigid material with the first portion shaped so as to form a smoothly contoured surface against which a users fingers press when they grip the sides of the housing (122) of the plug. On the other hand, the second portion (134) of the lever member is in the form of a rectangular tongue, as can be seen most clearly in FIG. 14. Lever member (136) is pivotally mounted in the housing (122) of the plug by means of a pivot pin (138), which is provided with a small torsion spring (139) which clips onto the first portion (132) of the lever member.

Figure 16:
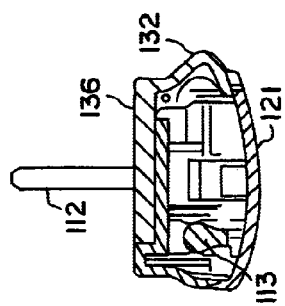
FIG. 16 is a section view through the line B—B in FIG. 15(d)

In FIGS. 15 and 16 the lever member (136) is shown in a first position in which the second portion (134) is retracted and does not substantially protrude from the front face (118) of the plug. In FIG. 17 and 18 the lever member (136) is shown in a second position in which the second portion (134) does protrude from the front face (118) of the plug so that it pushes against the socket and thereby acts as a lever to push the housing (122) away from a face plate of the socket. In this embodiment, the lever arm is biased towards the first position by means of the small torsion spring (139) provided within the housing (122). The spring (139) acts to prevent the second portion (134) of the lever arm from pivoting outwards and catching against the face plate of the socket during insertion of the plug.

Figure 17A:
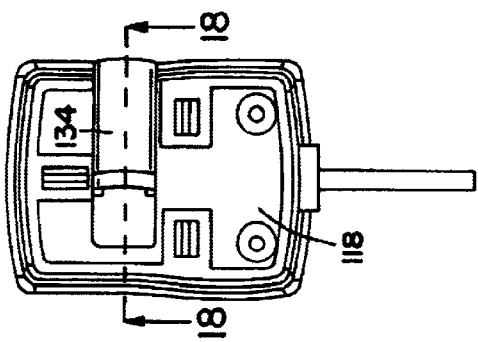
FIGS. 17(a),(b),(c),(d) and (e) illustrate the electrical plug of FIG. 11 showing the release mechanism in a second position.
Figure 17B:
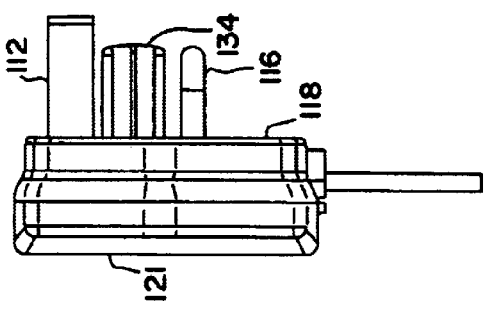
Figure 17C:
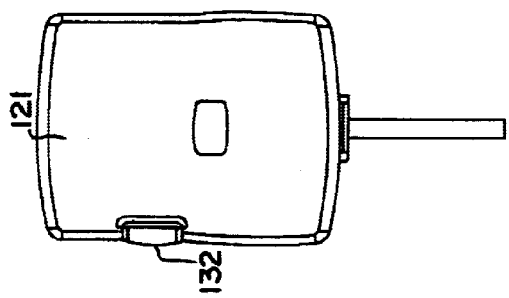
Figure 17D:
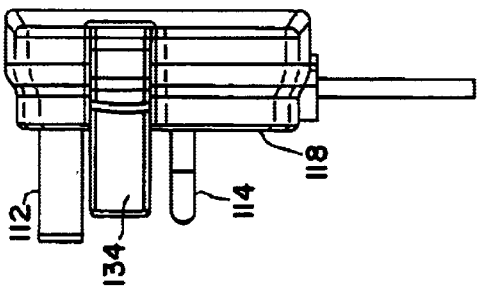
Figure 17E:
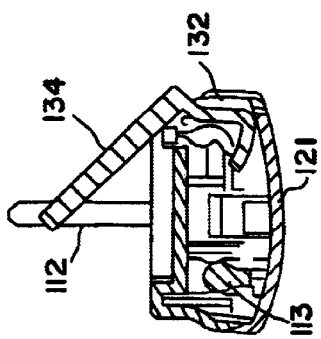
Figure 18:
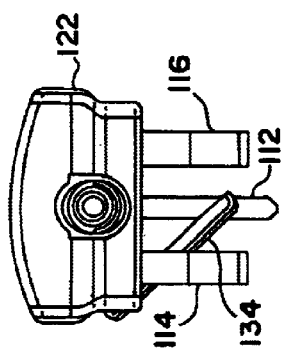
FIG. 18 is a section view through the line B—B in FIG. 17(d)

As can be seen most clearly in FIGS. 17(a) and (c), when the lever arm (136) is in its second position, the tongue shaped second portion (134) protrudes from the front face (118) of the plug in a space provided between the earth pin (112) and the two other pins (114), (116) of the plug. Hence, there is no danger of the second portion (134) touching the pins or interfering with the normal operation of the plug.

In an alternative embodiment, (not illustrated), the first portion of the release mechanism may comprise first and second press surfaces or buttons which respectively protrude from opposite sides of the housing (122) of the plug. Hence when a users fingers grip the side of the housing a press force is applied to both press surfaces to increase the lever action applied to the second portion of the release mechanism when the first portion is pressed by the user.

In a conventional electrical plug, the earth, neutral and live wires of the three core flex (124) are connected to the corresponding earth, neutral and live pins of the plug by means of screws which hold the exposed ends of the wires against a respective terminal for each pin provided within the plug housing. It is not uncommon for the screws which hold the exposed ends of the earth, neutral and live wires against the terminals to become loose due to constant handling of the plug. As a result, an open circuit is formed when one of the exposed ends of the wires fails to make proper electrical contact with the corresponding terminal. This results in a malfunction of the electrical appliance. The exposed end of the live wire may also result in a short circuit within the plug, if it inadvertently comes in contact with one of the other terminals. Such a short circuit can result in a high current flowing through the plug, which generates a large amount of heat that may result in melting and/or burning of the plug housing, producing a fire hazard.

Figure 19B:
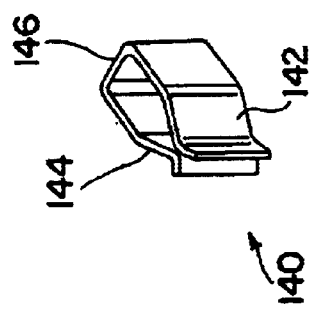
FIGS. 19(a) and (b) are enlarged perspective views of an electrical terminal clip employed in the electrical plug of FIG. 11; and, FIG. 20 illustrates the location of the electrical terminal clip within the electrical plug of FIG. 11.
Figure 19A:
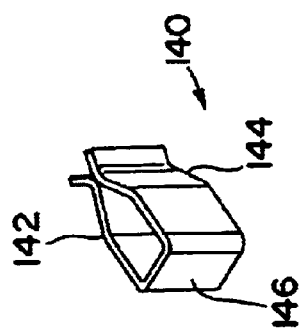

The present inventor has also developed an electrical terminal clip for connecting a wire to one of the pins at a terminal provided within the plug. An embodiment of the electrical terminal clip (140) according to the invention is illustrated in FIG. 19.

The terminal clip (140) of this embodiment, is manufactured from a single piece of spring steel bent into a shape so as to form first and second arms (142), (144) which are resiliently biased towards each other and have first and second surfaces between which a wire is received to provide an electrical connection to the terminal. The first and second arms (142), (144) are connected by means of a bridging portion (146) which acts as a spring to resiliently bias the first and second arms towards each other. The first and second (142), (144) are resiliently biased together with a force which is sufficient to securely grip the ends of the wires with substantially the same degree of effectiveness as the known screw-type connectors.

Figure 20:
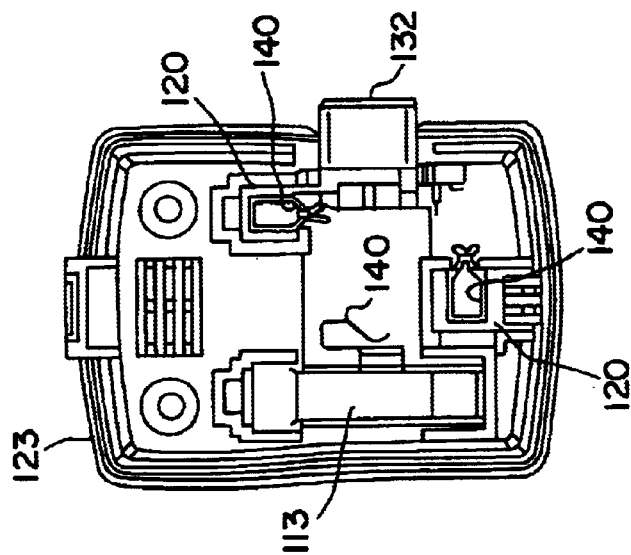

As shown in FIGS. 14 and 20 each of the terminals (120) is provided with a recess (126) within which the terminal clip (140) is slidably received. In the case of the live pin (116), the terminal (128) is designed to receive one end of the fuse (113) therein. The fuse holder (111) is provided with a terminal clip formed integral thereto. The recess (126) of each terminal (120) is sufficiently large to slidably receive a terminal clip (140) therein in a tight friction fit. In this way, the terminal clips (140) can be used instead of screws to hold the exposed ends of the three wires in electrical connection with the terminals. Since the clips (140) do not have any extra space for movement, unlike the screws which must be accessible to a screw driver, the clips will not work lose due to vibration and constant handling of the plug. On the other hand, the clip allows easy extraction of the wire when the plug needs to be repaired or a new flex connected thereto. The whole clip (140) can be removed from within the recess (126) of the terminal (120) and the wire can then be extracted with ease from between the first and second arms (142), (144).

Now that a preferred embodiment of the improved electrical plug in accordance with the invention has been described in detail, it will be apparent that the described plug provides a number of advantages over conventional electrical plugs, including the following:

(a) the release mechanism (130) enables easy extraction of the plug from a socket;

(b) it avoids the need to pull on the plug to remove it from the socket, since a small press force applied to the first portion (132) of the lever arm will activate the release mechanism and automatically push the plug away from the socket;

(c) inadvertent loosening or damage to the face plate of the socket can be avoided, since, the user does not have to pull on the plug but simply apply a press force to the side of the plug;

(d) the release mechanism is of simple construction and can be readily incorporated in a plug housing of conventional dimensions;

(e) the release mechanism is easy to use and inexpensive to manufacture;

(f) the electrical terminal clip provides secure connection of the exposed ends of the wires to the terminals within the plug.

Numerous variations and modifications to the described embodiment of the electrical plug will suggest themselves to persons skilled in the electrical arts, in addition to those already described, without departing from the basic inventive concepts. For example, the first and second portions of the release mechanism may be separate parts of the mechanism, which are mechanically connected within the housing of the plug. Thus, for example, the first portion (132) of the release mechanism may take the form of a press button which is slidably mounted in the side of the plug housing. The electrical plug may also take the form of a two-pin plug, and is not limited in its application to three-pin plugs.

Furthermore, the plug shown in FIGS. 11 to 20 may be used in conjunction with the socket shown in FIGS. 1 to 10.

The invention described herein is susceptible to variations, modifications and/or additions other than those specifically described and it is to be understood that the invention includes all such variations, modifications and/or additions which fall within the spirit and scope of the above description.

What is claimed is:

1. An electrical socket for a plug having a plurality of pins comprising a socket face plate including at least one set of apertures therein for receiving the respective pins of an electrical plug, wherein the socket face plate carries (i) at least live and neutral connectors, wherein the corresponding live and neutral pins on the plug are able to be brought into electrical connection with respective live and neutral connectors of the face plate when the plug pins are received in the set of apertures, and (ii) means for preventing withdrawal of the pins from the socket face plate when the pins have been received in the apertures;

a socket support including (i) at least live and neutral connectors which are adapted to be electrically connected to an electrical supply, and (ii) securing means which releasably secures the socket face plate to the socket support;

wherein when the socket face plate is secured to the support by securing means, the live and neutral electrical connectors on the socket face plate are brought into electrical connection respectively with the live and neutral connectors on the socket support; and wherein a screen is provided with an operating member for manually moving the screen from a first position to a second position to allow any said plug restrained from removal by said screen to become free for removal from said socket.

2. An electrical socket according to claim 1 wherein the electrical connectors on the socket face plate each comprises a projection and the electrical connectors on the socket support each comprise a recess, each projection being received in a respective recess when the socket face plate is secured to the socket support.

3. An electrical socket according to claim 1 wherein the electrical connectors on the socket support each comprises a projection, and the electrical connectors on the socket face plate each comprise a recess, each projection being received in a respective recess when the face plate is secured to the support.

4. An electrical socket according to claim 1 wherein the securing means comprises a snap-fit connection provided between the socket support and the socket face plate.

5. An electrical socket according to claim 1 wherein the socket support further comprises a housing within which the electrical connectors are disposed and presents the securing means for securing the socket face plate to the housing.

6. An electrical socket according to claim 1 wherein a circuit breaker is carried on the socket face plate for disconnecting the electrical connection between the mains supply and any plug received in the or each set of apertures in response to a current leak or current overload in such away that said circuit breaker is received within the support housing when the socket face plate is secured to the support.

7. An electrical socket according to claim 1 wherein the socket support is adapted to be fixed to a structure and the electrical connections of the socket support are adapted to be directly connected to the mains wires installed in the structure.

8. An electrical socket according to claim 1 wherein the electrical socket further comprises an electrical connector lead, and a plug, the electrical connector lead being secured at one end to the electrical connections of the socket support, and being secured at the other end to the plug.

9. An electrical socket according to claim 1 wherein the electrical connectors of the socket support are provided in the form of a female connector and the electrical connectors carried by the socket face plate are provided in the form of a male connector.

10. An electrical socket according to claim 1 wherein the electrical connectors of the socket support are provided in the form of a male connector and the electrical connectors carried by the face plate are provided in the form of a female connector.

11. An electrical socket according to claim 1, wherein the socket face plate is provided with at least two of said sets of apertures.

12. An electrical socket according to claim 12 wherein the size and/or configuration of one of said sets of apertures is different from the size and/or configuration of another of the sets of apertures, whereby the socket face plate is adapted to receive at least two different types of plug.

13. An electrical socket according to claim 1 wherein the socket support is further provided with an earth connector which is adapted to be connected to an electrical supply.

14. An electrical socket according to claim 13 wherein the socket face plate is further provided with an earth connector which is brought into electrical connection with the earth connector of the socket support when the face plate is secured to the socket support, whereby an earth pin of the plug can be bought into electrical connection with the earth connection of the socket face plate when the plug pins are received in the set of apertures in the socket face plate.

15. An electrical socket according to claim 1 wherein the means for preventing withdrawal comprises the screen having a plurality of apertures therein for receiving the pins of the plug, and wherein the screen is movable relative to said socket face plate between the first position in which at least one of the screen apertures are out of alignment with the socket plate apertures, and the second position in which the screen apertures are in alignment with the socket plate apertures, said first condition corresponding with a condition wherein a said plug is able to be prevented from withdrawal from said socket face plate by virtue of engagement of a surface of said screen with a complementary locking formation of at least one pin of said plug.

16. An electrical socket according to claim 1 wherein a cover is provided for the socket support, the cover being releasably securable to the socket support when the socket face plate has been released from the support, the cover serving to prevent access to the electrical connections of the support.

17. An electrical socket according to claim 15, wherein the screen is engaged to said socket face plate in a manner movable from the first position to the second position under the pressure of the plug pins when the plug is moved to a fully inserted position with said socket.

18. An electrical socket according to claim 17 wherein the screen is biased towards the first position so that said surface of said screen is biased toward engagement with complementary locking formations of said pin when the plug is received by the socket.

19. An electrical socket for a plug having a plurality of pins comprising a socket face plate including at least one set of apertures therein for receiving the respective pins of an electrical plug, wherein the socket face plate carries (i) at least live and neutral connectors, wherein the corresponding live and neutral pins on the plug are able to be brought into electrical connection with respective live and neutral connectors of the face plate when the plug pins are received in the set of apertures, and (ii) means for preventing withdrawal of the pins from the socket face plate when the pins have been received in the apertures;

a socket support including (i) at least live and neutral connectors which are adapted to be electrically connected to an electrical supply, and (ii) securing means which releasably secures the socket face plate to the socket support;

wherein when the socket face plate is secured to the support by securing means, the live and neutral electrical connectors on the socket face plate are brought into electrical connection respectively with the live and neutral connectors on the socket support; and wherein the socket face plate is provided with at least two of said sets of apertures and wherein the face socket plate is adapted to receive at least two different types of plug.

20. An electrical socket according to claim 19 wherein the means for preventing withdrawal comprises a screen having a plurality of apertures therein for receiving the pins of the plug, and wherein the screen is movable relative to said socket face plate between a first position in which at least one of the screen apertures are out of alignment with the socket plate apertures, and a second position in which the screen apertures are in alignment with the socket plate apertures, said first condition corresponding with a condition wherein a said plug is able to be prevented from withdrawal from said socket face plate by virtue of engagement of a surface of said screen with a complementary locking formation of at least one pin of said plug.

21. An electrical socket according to claim 19 wherein the size and/or configuration of one of said sets of apertures is different from the size and/or configuration of another of the sets of apertures, whereby the socket face plate is adapted to receive at least two different types of plug.

22. An electrical socket according to claim 19 wherein the electrical connectors on the socket face plate each comprises a projection and the electrical connectors on the socket support each comprise a recess, each projection being received in a respective recess when the socket face plate is secured to the socket support.

23. An electrical socket according to claim 19 wherein the electrical connectors on the socket support each comprises a projection, and the electrical connectors on the socket face plate each comprise a recess, each projection being received in a respective recess when the face plate is secured to the support.

24. An electrical socket according to claim 19 wherein the securing means comprises a snap-fit connection provided between the socket support and the socket face plate.

25. An electrical socket according to claim 19 wherein a cover is provided for the socket support, the cover being releasably securable to the socket support when the socket face plate has been released from the support, the cover serving to prevent access to the electrical connections of the support.

26. An electrical socket according to claim 19 wherein the socket support further comprises a housing within which the electrical connectors are disposed and presents the securing means for securing the socket face plate to the housing.

27. An electrical socket according to claim 19 wherein a circuit breaker is carried on the socket face plate for disconnecting the electrical connection between the mains supply and any plug received in the or each set of apertures in response to a current leak or current overload in such away that said circuit breaker is received within the support housing when the socket face plate is secured to the support.

28. An electrical socket according to claim 19 wherein the socket support is adapted to be fixed to a structure and the electrical connections of the socket support are adapted to be directly connected to the mains wires installed in the structure.

29. An electrical socket according to claim 19 wherein the electrical socket further comprises an electrical connector lead, and a plug, the electrical connector lead being secured at one end to the electrical connections of the socket support, and being secured at the other end to the plug.

30. An electrical socket according to claim 19 wherein the electrical connectors of the socket support are provided in the form of a female connector and the electrical connectors carried by the socket face plate are provided in the form of a male connector.

31. An electrical socket according to claim 19 wherein the electrical connectors of the socket support are provided in the form of a male connector and the electrical connectors carried by the face plate are provided in the form of a female connector.

32. An electrical socket according to claim 20, wherein the screen is engaged to said socket face plate in a manner movable from the first position to the second position under the pressure of the plug pins when the plug is moved to a fully inserted position with said socket.

33. An electrical socket according to claim 32, wherein the screen is provided with an operating member for manually moving the screen from the first position to the second position to allow any said plug restrained from removal by said screen to become free for removal from said socket; and
wherein the screen is biased towards the first position so that said surface of said screen is biased toward engagement with complementary locking formations of said pin when the plug is received by the socket.

34. An electrical socket according to claim 19 wherein the socket support is further provided with an earth connector which is adapted to be connected to an electrical supply.

35. An electrical socket according to claim 34 wherein the socket face plate is further provided with an earth connector which is brought into electrical connection with the earth connector of the socket support when the face plate is secured to the socket support, whereby an earth pin of the plug can be bought into electrical connection with the earth connection of the socket face plate when the plug pins are received in the set of apertures in the socket face plate.

36. An electrical socket for a plug having a plurality of pins comprising:
a socket face plate including at least one set of apertures therein for receiving the respective pins of an electrical plug, wherein the socket face plate carries (i) at least live and neutral connectors, wherein the corresponding live and neutral pins on the plug are able to be brought into electrical connection with respective live and neutral connectors of the face plate when the plug pins are received in the set of apertures, and (ii) means for preventing withdrawal of the pins from the socket face plate when the pins have been received in the apertures;
a socket support including (i) at least live and neutral connectors which are adapted to be electrically connected to an electrical supply, and (ii) securing means which releasably secures the socket face plate to the socket support;
wherein when the socket face plate is secured to the support by securing means, the live and neutral electrical connectors on the socket face plate are brought into electrical connection respectively with the live and neutral connectors on the socket support; and
wherein a cover is provided for the socket support, the cover being releasably securable to the socket support when the socket face plate has been released from the support, the cover serving to prevent access to the electrical connections of the support.

37. An electrical socket according to claim 36 wherein the size and/or configuration of one of said sets of apertures is different from the size and/or configuration of another of the sets of apertures, whereby the socket face plate is adapted to receive at least two different types of plug.

38. An electrical socket according to claim 36 wherein the electrical connectors on the socket face plate each comprises a projection and the electrical connectors on the socket support each comprise a recess, each projection being received in a respective recess when the socket face plate is secured to the socket support.

39. An electrical socket according to claim 36 wherein the electrical connectors on the socket support each comprises a projection, and the electrical connectors on the socket face plate each comprise a recess, each projection being received in a respective recess when the face plate is secured to the support.

40. An electrical socket according to claim 36 wherein the securing means comprises a snap-fit connection provided between the socket support and the socket face plate.

41. An electrical socket according to claim 36 wherein the socket support further comprises a housing within which the electrical connectors are disposed and presents the securing means for securing the socket face plate to the housing.

42. An electrical socket according to claim 36 wherein a circuit breaker is carried on the socket face plate for disconnecting the electrical connection between the mains supply and any plug received in the or each set of apertures in response to a current leak or current overload in such away that said circuit breaker is received within the support housing when the socket face plate is secured to the support.

43. An electrical socket according to claim 36 wherein the socket support is adapted to be fixed to a structure and the electrical connections of the socket support are adapted to be directly connected to the mains wires installed in the structure.

44. An electrical socket according to claim 36 wherein the electrical socket further comprises an electrical connector lead, and a plug, the electrical connector lead being secured at one end to the electrical connections of the socket support, and being secured at the other end to the plug.

45. An electrical socket according to claim 36 wherein the electrical connectors of the socket support are provided in the form of a female connector and the electrical connectors carried by the socket face plate are provided in the form of a male connector.

46. An electrical socket according to claim 36 wherein the electrical connectors of the socket support are provided in the form of a male connector and the electrical connectors carried by the face plate are provided in the form of a female connector.

47. An electrical socket according to claim 36 wherein the means for preventing withdrawal comprises a screen having a plurality of apertures therein for receiving the pins of the plug, and wherein the screen is movable relative to said socket face plate between a first position in which at least one of the screen apertures are out of alignment with the socket plate apertures, and a second position in which the screen apertures are in alignment with the socket plate apertures, said first condition corresponding with a condition wherein a said plug is able to be prevented from withdrawal from said socket face plate by virtue of engagement of a surface of said screen with a complementary locking formation of at least one pin of said plug.

48. An electrical socket according to claim 42, wherein the screen is engaged to said socket face plate in a manner movable from the first position to the second position under the pressure of the plug pins when the plug is moved to a fully inserted position with said socket.

49. An electrical socket according to claim 42, wherein the screen is provided with an operating member for manually moving the screen from the first position to the second position to allow any said plug restrained from removal by said screen to become free for removal from said socket; and
 wherein the screen is biased towards the first position so that said surface of said screen is biased toward engagement with complementary locking formations of said pin when the plug is received by the socket.

50. An electrical socket according to claim 36 wherein the socket support is further provided with an earth connector which is adapted to be connected to an electrical supply.

51. An electrical socket according to claim 50 wherein the socket face plate is further provided with an earth connector which is brought into electrical connection with the earth connector of the socket support when the face plate is secured to the socket support, whereby an earth pin of the plug can be bought into electrical connection with the earth connection of the socket face plate when the plug pins are received in the set of apertures in the socket face plate.

52. An electrical socket for a plug having a plurality of pins comprising
 a socket face plate including at least one set of apertures therein for receiving the respective pins of an electrical plug, wherein the socket face plate carries (i) at least live and neutral connectors, whereby the corresponding live and neutral pins on the plug are able to be brought into electrical connection with respective live and neutral connectors of the face plate when the plug pins are received in the set of apertures;
 a socket support including (i) at least live and neutral connectors which are adapted to be electrically connected to a mains electrical supply, and (ii) securing means which releasably secures the socket face plate to the socket support;
 wherein when the socket face plate is secured to the support by securing means, the live and neutral electrical connectors on the socket face plate are brought into electrical connection respectively with the live and neutral connectors on the socket support; and
 wherein a cover is provided for the socket support, the cover being releasably securable to the socket support when the socket face plate has been released from the support, the cover serving to prevent access to the electrical connections of the support.

53. An electrical socket according to claim 52 wherein the electrical connectors on the socket face plate each comprises a projection and the electrical connectors on the socket support each comprise a recess, each projection being received in a respective recess when the socket face plate is secured to the socket support.

54. An electrical socket according to claim 52 wherein the electrical connectors on the socket support each comprises a projection, and the electrical connectors on the socket face plate each comprise a recess, each projection being received in a respective recess when the face plate is secured to the support.

55. An electrical socket according to claim 52 wherein the securing means comprises a snap-fit connection provided between the socket support and the socket face plate.

56. An electrical socket according to claim 52 wherein the socket support further comprises a housing within which the electrical connectors are disposed and presents the securing means for securing the socket face plate to the housing.

57. An electrical socket according to claim 52 wherein a circuit breaker is carried on the socket face plate for disconnecting the electrical connection between the mains supply and any plug received in the or each set of apertures in response to a current leak or current overload in such away that said circuit breaker is received within the support housing when the socket face plate is secured to the support.

58. An electrical socket according to claim 52 wherein the socket support is adapted to be fixed to a structure and the electrical connections of the socket support are adapted to be directly connected to the mains wires installed in the structure.

59. An electrical socket according to claim 52 wherein the electrical socket further comprises an electrical connector lead, and a plug, the electrical connector lead being secured at one end to the electrical connections of the socket support, and being secured at the other end to the plug.

60. An electrical socket according to claim 52 wherein the electrical connectors of the socket support are provided in the form of a female connector and the electrical connectors carried by the socket face plate are provided in the form of a male connector.

61. An electrical socket according to claim 52 wherein the electrical connectors of the socket support are provided in the form of a male connector and the electrical connectors carried by the face plate are provided in the form of a female connector.

62. An electrical socket according to claim 52 wherein the socket face plate is provided with at least two of said sets of apertures.

63. An electrical socket according to claim 62 wherein the size and/or configuration of one of said sets of apertures is different from the size and/or configuration of another of the sets of apertures, whereby the socket face plate is adapted to receive at least two different types of plug.

64. An electrical socket according to claim 52 wherein the socket support is further provided with an earth connector which is adapted to be connected to a mains electrical supply.

65. An electrical socket according to claim 64 wherein the socket face plate is further provided with an earth connector which is brought into electrical connection with the earth connector of the socket support when the face plate is secured to the socket support, whereby an earth pin of the plug can be bought into electrical connection with the earth connection of the socket face plate when the plug pins are received in the set of apertures in the socket face plate.

* * * * *